(12) United States Patent
Fujikawa et al.

(10) Patent No.: US 12,725,886 B2
(45) Date of Patent: Sep. 1, 2026

(54) ALL-SOLID-STATE BATTERY

(71) Applicant: Maxell, Ltd., Otokuni-gun (JP)

(72) Inventors: Katsuhiro Fujikawa, Otokuni-gun (JP); Koji Yamaguchi, Otokuni-gun (JP); Takumi Otsuka, Otokuni-gun (JP)

(73) Assignee: MAXELL, LTD., Kyoto (JP)

( * ) Notice: Subject to any disclaimer, the term of this patent is extended or adjusted under 35 U.S.C. 154(b) by 662 days.

(21) Appl. No.: 18/036,746

(22) PCT Filed: Nov. 10, 2021

(86) PCT No.: PCT/JP2021/041276

§ 371 (c)(1),
(2) Date: May 12, 2023

(87) PCT Pub. No.: WO2022/102639

PCT Pub. Date: May 19, 2022

(65) Prior Publication Data

US 2023/0411802 A1 Dec. 21, 2023

(30) Foreign Application Priority Data

Nov. 13, 2020 (JP) ................................ 2020-189111

(51) Int. Cl.
*H01M 50/531* (2021.01)
*H01M 10/0525* (2010.01)
(Continued)

(52) U.S. Cl.
CPC ..... *H01M 50/531* (2021.01); *H01M 10/0525* (2013.01); *H01M 10/0562* (2013.01);
(Continued)

(58) Field of Classification Search
None
See application file for complete search history.

(56) References Cited

U.S. PATENT DOCUMENTS

2002/0012625 A1 1/2002 Watanabe et al.
2005/0019663 A1 * 1/2005 Nanno ................ H01M 50/109 429/174

(Continued)

FOREIGN PATENT DOCUMENTS

EP 2911227 A1 8/2015
JP 01134876 A * 5/1989

(Continued)

OTHER PUBLICATIONS

Abstract of JP-01134876-A (Year: 1989).*

(Continued)

*Primary Examiner* — Gregg Cantelmo
(74) *Attorney, Agent, or Firm* — WHDA, LLP

(57) ABSTRACT

An all-solid-state battery 1 includes: an exterior can 2 having a bottom 21 and a cylindrical side wall 22; a negative-electrode can 3 having a flat portion 31 and a peripheral wall 32; a power generation element 4 located between the exterior can 2 and the negative-electrode can 3; a gasket 6 positioned between the cylindrical side wall 22 and peripheral wall 32; and recoverable conductive sheets 5. The bottom 21 of the exterior can 2 includes a recessed portion 211 recessed toward the outside. A recoverable (Continued)

conductive sheet 5 is located between the power generation element 4 and the inner bottom surface of the recessed portion 211, and another recoverable conductive sheet is located between the power generation element 4 and the flat portion 31 of the seal can 3.

5 Claims, 5 Drawing Sheets

(51) Int. Cl.

| | |
|---|---|
| ***H01M 10/0562*** | (2010.01) |
| ***H01M 10/0585*** | (2010.01) |
| ***H01M 50/109*** | (2021.01) |
| ***H01M 50/167*** | (2021.01) |
| ***H01M 50/184*** | (2021.01) |
| ***H01M 50/186*** | (2021.01) |
| ***H01M 50/528*** | (2021.01) |

(52) U.S. Cl.

CPC ..... *H01M 10/0585* (2013.01); *H01M 50/109* (2021.01); *H01M 50/167* (2021.01); *H01M 50/184* (2021.01); *H01M 50/186* (2021.01); *H01M 50/528* (2021.01)

(56) References Cited

U.S. PATENT DOCUMENTS

| | | | | |
|---|---|---|---|---|
| 2008/0248384 | A1* | 10/2008 | Yabushita | H01M 50/153 429/185 |
| 2010/0068614 | A1 | 3/2010 | Yamaguchi et al. | |
| 2021/0328292 | A1 | 10/2021 | Otsuka et al. | |

FOREIGN PATENT DOCUMENTS

| | | | |
|---|---|---|---|
| JP | 11-144761 | A | 5/1999 |
| JP | 2003-151511 | A | 5/2003 |
| JP | 2005203170 | A | 7/2005 |
| JP | 2008186711 | A | 8/2008 |
| WO | 2020/066323 | A1 | 4/2020 |

OTHER PUBLICATIONS

International Search Report dated Dec. 21, 2021, issued in counterpart International Application No. PCT/JP2021/041276 (2 pages).

Notice of Reasons for Refusal dated Jun. 3, 2025, issued in counterpart JP Application No. 2022-519526, with English translation. (6 pages).

* cited by examiner

ALL-SOLID-STATE BATTERY

TECHNICAL FIELD

The present disclosure relates to an all-solid-state battery.

BACKGROUND ART

A conventional technique, JP H11-144761 A, discloses a lithium-ion secondary battery including a positive electrode and a negative electrode arranged to face each other, with a separator provided therebetween, and contained within a battery case composed of a positive-electrode can and a negative-electrode can that are crimped together, with a gasket provided therebetween (Patent Document 1). The lithium-ion secondary battery includes elastic bodies covered with a conductor, one located between the positive electrode and positive-electrode can and another between the negative electrode and negative-electrode can. This ensures that the lithium-ion secondary battery provides sufficient areas of contact between the positive electrode and positive-electrode can and between the negative electrode and negative-electrode can, and mitigates the stress generated during crimping of the positive- and negative-electrode cans to prevent cracking of the positive and negative electrodes.

JP 2003-151511 A discloses a flat nonaqueous electrolyte battery including a positive-electrode can and a negative-electrode can as well as a cathode member, an anode member and a separator contained in those cans, where a gasket is positioned between the peripheral edge of the positive-electrode can and the peripheral edge of the negative-electrode can (Patent Document 2). The flat nonaqueous electrolyte battery includes a sealing wall on the peripheral edge of the bottom wall of the positive-electrode can to abut the gasket, and the cathode member is contained in a recess located radially inward of the sealing wall. Thus, in a high-temperature environment, the flat nonaqueous electrolyte battery deforms in such a way that the bottom wall of the recess expands, and thus the sealing wall is not affected. Further, the ratio of the inner measurement diameter D2 of the recess to the inner diameter measurement D1 of the containing portion of the top wall of the negative-electrode can, D2/D1, is 1.01 to 1.2, thereby preventing, during the assembly step, the peripheral edge of the cathode member from moving up onto the edge of the opening of the recess and thus being damaged.

PRIOR ART DOCUMENTS

Patent Documents

[Patent Document 1] JP H11-144761 A
[Patent Document 2] JP 2003-151511 A

SUMMARY OF THE INVENTION

The lithium-ion secondary battery of Patent Document 1 uses elastic bodies with their surfaces covered with a conductor. In other words, a conductor that is electrically conductive is only positioned around the electric bodies. Thus, the elastic bodies of Patent Document 1 represent a resistance component that impairs electric conductivity, which increases the internal resistance of the battery.

In the flat nonaqueous electrolyte battery of Patent Document 2, the bottom wall of the positive-electrode can has a recess located radially inward of the sealing wall, thereby improving sealability. However, the flat nonaqueous electrolyte battery of Patent Document 2 is not an all-solid-state battery; that is, the battery is not supposed to contain a power generation element having a cathode layer, a solid electrolyte layer and an anode layer stacked on top of each other. As such, no mitigating member is provided that would resist pressing forces generated during crimping of the positive-electrode can and seal can; thus, if a power generation element is contained in this battery, the element may suffer damage, such as cracks.

In view of this, an object of the present disclosure is to provide an all-solid-state battery that provides a sufficient electric contact between the exterior can and power generation element as well as a sufficient electric contact between the seal can and power generation element and that prevents damage to the cathode or anode layer.

To solve the above-identified problem, the present disclosure provides the following arrangement: An all-solid-state battery according to the present disclosure may include an exterior can having a bottom with a recessed portion recessed toward an outside and a cylindrical side wall. The all-solid-state battery may include a seal can having a flat portion and a peripheral wall for covering an opening of the exterior can. The all-solid-state battery may include a power generation element including a cathode layer, an anode layer and a solid electrolyte layer located between the cathode layer and the anode layer, the power generation element located between an inner bottom surface of the recessed portion of the exterior can and the flat portion of the seal can. The all-solid-state battery may include a gasket to be crimped between the cylindrical side wall of the exterior can and the peripheral wall of the seal can. The all-solid-state battery may include at least one of a first recoverable conductive sheet located between the inner bottom surface of the recessed portion and the power generation element, and a second recoverable conductive sheet located between the flat portion of the seal can and the power generation element.

The all-solid-state battery according to the present disclosure may provide a sufficient electric contact between the exterior can and power generation element as well as a sufficient electric contact between the seal can and power generation element and prevent damage to the cathode or anode layer.

EMBODIMENTS FOR CARRYING OUT THE INVENTION

Figure 1:
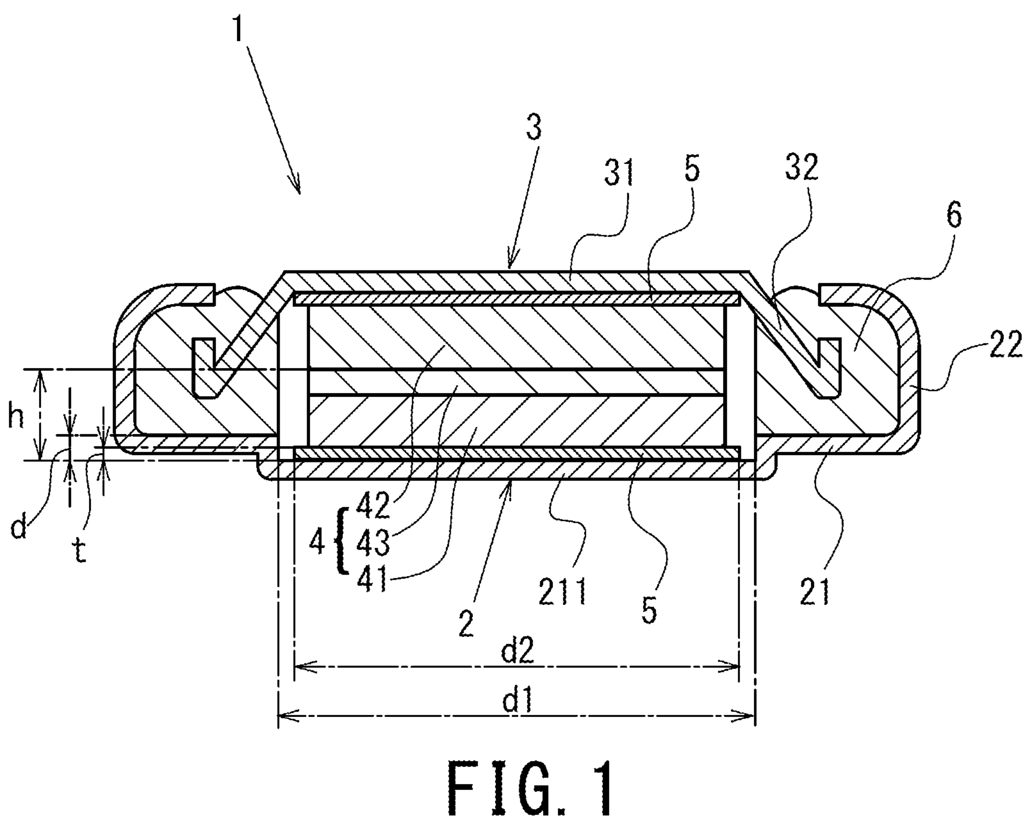
FIG. 1 is a cross-sectional view of an all-solid-state battery according to an embodiment, illustrating its structure.

An all-solid-state battery according to and an embodiment may include an exterior can having a bottom with a recessed portion recessed toward an outside and a cylindrical side wall. The all-solid-state battery may include a seal can having a flat portion and a peripheral wall for covering an opening of the exterior can. The all-solid-state battery may include a power generation element including a cathode layer, an anode layer and a solid electrolyte layer located between the cathode layer and the anode layer, the power generation element located between an inner bottom surface of the recessed portion of the exterior can and the flat portion of the seal can. The all-solid-state battery may include a gasket to be crimped between the cylindrical side wall of the exterior can and the peripheral wall of the seal can. The all-solid-state battery may include a recoverable conductive sheet located between the power generation element and at least one of the inner bottom surface of the recessed portion and the flat portion of the seal can.

The recoverable conductive sheet, by virtue of its recovery performance, can continuously maintain good conductivity between the exterior can and the power generation element as well as good conductivity between the seal can and power generation element and, at the same time, work as a shock absorber to mitigate pressing forces generated during crimping of the exterior can and seal can, thus preventing damage to the cathode and anode layers. Further, if the recoverable conductive sheet (the first recoverable conductive sheet) is provided between the inner bottom surface of the recessed portion and the power generation element, the positioning of the sheet within the recessed portion will prevent the first recoverable conductive sheet from being displaced during crimping of the exterior can and seal can to such a degree as to be tucked in between the bottom of the exterior can and gasket. This will prevent a decrease in the sealability of the all-solid-state battery.

The first recoverable conductive sheet may be located between the inner bottom surface of the recessed portion and the power generation element. The recessed portion may have a depth larger than a thickness of the first recoverable conductive sheet. In other words, the first recoverable conductive sheet has a thickness smaller than the depth of the recessed portion. Thus, during crimping of the exterior can and seal can, the first recoverable conductive sheet will be further prevented from being tucked in between the bottom of the exterior can and the gasket.

The first recoverable conductive sheet may be located between the inner bottom surface of the recessed portion and the power generation element. The all-solid-state battery may further include a second recoverable conductive sheet located between the flat portion of the seal can and the power generation element. These sheets can continuously maintain good conductivity between the exterior can and power generation element and good conductivity between the seal can and power generation element and, at the same time, work as shock absorbers, thereby mitigating pressing forces generated during crimping of the exterior can and seal can and thus preventing damage to the cathode and anode layers. Further, since the first recoverable conductive sheet is provided between the inner bottom surface of the recessed portion and the power generation element, the positioning of the sheet within the recessed portion will prevent the first recoverable conductive sheet from being displaced during crimping of the exterior can and seal can to such a degree as to be tucked in between the bottom of the exterior can and the gasket. This will prevent a decrease in the sealability of the all-solid-state battery.

The recessed portion may have a depth smaller than a height from the inner bottom surface of the recessed portion to an upper end of a peripheral surface of the solid electrolyte layer. This will prevent contact between the bottom of the exterior can and the anode layer and thus prevent a short circuit.

The first and second recoverable conductive sheets may be graphite sheets.

Now, embodiments of the present disclosure will be specifically described with reference to FIGS. 1 to 4. First, as shown in FIG. 1, an all-solid-state battery 1 includes an exterior can 2, a seal can 3, a power generation element 4, a recoverable conductive sheet 5 located between the exterior can 2 and power generation element 4, another recoverable conductive sheet 5 located between the seal can 3 and power generation element 4, and a gasket 6. In the present embodiment, the all-solid-state battery 1 is a flat battery.

The exterior can 2 includes a circular bottom 21 and a cylindrical side wall 22 having the shape of a circular cylinder and extending from the periphery of the bottom 21, the bottom and side wall forming a continuous member. In longitudinal cross-sectional view, the cylindrical side wall 22 extends generally perpendicularly to the bottom 21. The exterior can 2 is formed from a metal material such as stainless steel.

The bottom 21 of the exterior can 2 has a recessed portion 211. The recessed portion 211 is formed integrally with the exterior can 2 by pressing. The recessed portion 211 is recessed in the axial direction away from the bottom 21 toward the outside of the all-solid-state battery 1 (i.e., downward in the drawing). The recessed portion 211 contains the relevant recoverable conductive sheet 5. The recessed portion 211 has a depth d. As shown in FIG. 1, the depth d of the recessed portion 211 is the depth as measured from the inner surface of the bottom 21 down to the inner bottom surface of the recessed portion 211. The depth d and inner diameter d1 of the recessed portion 211 will be described in more detail further below.

The seal can 3 includes a circular flat portion 31 and a cylindrical peripheral wall 32 extending from the periphery of the flat portion 31, the flat portion and peripheral wall forming a continuous member. The opening of the seal can 3 faces the opening of the exterior can 2. The seal can 3 is formed from a metal material such as stainless steel.

The power generation element 4 and recoverable conductive sheets 5 are placed in the interior space of the exterior can 2 and seal can 3 before the cans are crimped, with a gasket 6 positioned between the cylindrical side wall 22 of the exterior can 2 and the peripheral wall 32 of the seal can 3. Specifically, the exterior can 3 and seal can 3 are positioned such that the openings of the exterior can 3 and seal can 3 face each other and the peripheral wall 32 of the seal can 3 is inserted inside the cylindrical side wall 22 of the exterior can 2 before the cans are crimped with the gasket 6 positioned between the cylindrical side wall 22 and peripheral wall 32. Thus, the interior space formed by the exterior can 2 and seal can 3 is hermetically sealed. It will be understood that the constructions of the exterior can 2, seal can 3 and gasket 6 are not limited to any particular material or shape or any other feature.

The power generation element 4 includes a cathode layer 41, an anode layer 42 and a solid electrolyte layer 43. The solid electrolyte layer 43 is located between the cathode layer 41 and anode layer 42. In the power generation element 4, the layers are stacked on top of each other in the following order, in the direction away from the bottom 21 of the exterior can 2 (i.e., upward from below in the drawing): the cathode layer 41, the solid electrolyte layer 43, and the anode layer 42. The power generation element 4 has the shape of a circular column. The power generation element 4 is positioned on the inner bottom surface of the recessed portion 211 of the exterior can 2, with the recoverable conductive sheet 5 provided therebetween. Thus, the exterior can 2 functions as a positive-electrode can. Further, the power generation element 4 is in contact with the inner surface of the flat portion 31 of the seal can 3, with the recoverable conductive sheet 5 provided therebetween. Thus, the seal can 3 functions as a negative-electrode can. It will be understood that the power generation element 4 is not limited to a columnar shape, and various modifications are possible depending on the shape of the all-solid-state battery 1; for example, the element may have the shape of a rectangular parallelepiped or a prism.

The cathode layer 41 is a cathode pellet made of a cathode active material used in a lithium-ion secondary battery, constituted by a 180 mg cathode mixture containing $LiNi_{0.6}Co_{0.2}Mn_{0.2}O_2$ with an average grain diameter of 3 μm, a sulfide solid electrolyte ($Li_6PS_5Cl$), and carbon nanotubes working as a conductive aid, in a mass ratio of 55:40:5, which is formed in a mold with a diameter of 10 mm into a columnar shape. The cathode layer 41 is not limited to any particular material as long as it can function as a cathode layer for the power generation element 4, and may be made of, for example, lithium cobalt oxide, lithium nickel oxide, lithium manganese oxide, lithium nickel cobalt manganese composite oxide, or olivine-type composite oxide, or any appropriate mixture thereof. Further, the size and/or shape of the cathode layer 41 is not limited to a columnar shape, and various modifications are possible depending on the size and/or shape of the all-solid-state battery 1.

The anode layer 42 is an anode pellet made of an anode active material used in a lithium-ion secondary battery, constituted by a 300 mg anode mixture containing LTO ($Li_4Ti_5O_{12}$, i.e., lithium titanate), a sulfide solid electrolyte ($Li_6PS_5Cl$), and carbon nanotubes in a weight ratio of 50:45:5, which is formed into a columnar shape. The anode layer 42 is not limited to any particular material as long as it can function as an anode layer for the power generation element 4, and may be made of, for example, metallic lithium, a lithium alloy, a carbon material such as graphite or low-crystalline carbon, SiO, or LTO ($Li_4Ti_5O_{12}$, i.e., lithium titanate), or any appropriate mixture thereof. Further, the size and/or shape of the anode layer 42 is not limited to a columnar shape, and various modifications are possible depending on the size and/or shape of the all-solid-state battery 1.

The solid electrolyte layer 43 is a 60 mg sulfide solid electrolyte ($Li_6PS_5Cl$) formed into a columnar shape. The solid electrolyte layer 43 is not limited to any particular material, and may be a sulfur-based solid electrolyte of another type, such as an argyrodite-based one to improve ionic conductivity. If a sulfur-based solid electrolyte is to be used, it is preferable to coat the surface of the cathode active material with niobium oxide (such as $LiNbO_3$) to prevent reaction with the cathode active material. Alternatively, the solid electrolyte layer 43 may be a hydride-based solid electrolyte or an oxide-based solid electrolyte, for example. Further, the size and/or shape of the solid electrolyte layer 43 is not limited to a columnar shape, and various modifications are possible depending on the size and/or shape of the solid-state battery 1.

Each recoverable conductive sheet 5 is electrically conductive and is formed from a material that, when being compressed into a smaller thickness, generates a certain level of resilience in a way to recover its original shape. The sheet constituting the recoverable conductive sheet 5 used is made of an elastically deformable material such as a conductive rubber that is elastic and contains carbon black or metal powder and rubber that are uniformly mixed to be electrically conductive; alternatively, a material may also be preferably used that does not completely recover its original shape after release of compression and recovers some of its thickness by a predetermined rate of recovery, such as graphite sheet. A recoverable conductive sheet 5 is positioned between the recessed portion 211 of the exterior can 2 and the cathode layer 41 of the power generation element 4, and another recoverable conductive sheet 5 is positioned between the flat portion 31 of the seal can 3 and the anode layer 42 of the power generation element 4. In other words, recoverable conductive sheets 5 are provided on both the top and bottom surfaces of the power generation element 4. The shape of each recoverable conductive sheet 5 in plan view is generally analogous to the shape of the interior space of the all-solid-state battery 1 in plan view. Thus, each recoverable conductive sheet 5 is generally circular in shape in plan view. The area of the upper surface of the recoverable conductive sheet 5 located adjacent to the exterior can 2 may be equal to the area of the lower surface of the cathode layer 41 of the power generation element 4, or may be a little different from the area of the lower surface of the cathode layer 41 of the power generation element 4. Further, the area of the lower surface of the recoverable conductive sheet 5 located adjacent to the seal can 3 may be equal to the area of the upper surface of the anode layer 42 of the power generation element 4, or may be a little different from the area of the upper surface of the anode layer 42 of the power generation element 4. The upper surface of the recoverable conductive sheet 5 located adjacent to the exterior can 2 preferably covers the lower surface of the cathode layer 41, and the lower surface of the recoverable conductive sheet 5 located adjacent to the seal can 3 preferably covers the upper surface of the anode layer 42. During battery assembly, the recoverable conductive sheets 5, together with the power generation element 4, are pressed due to crimping, and battery assembly is completed with the recoverable conductive sheets 5 compressed in the thickness direction (i.e., top-bottom direction in FIG. 1), which thus function as current-collecting sheets. As the assembled all-solid-state battery 1 is charged and discharged, the power generation element 4 repeatedly expands and contracts; however, since the recoverable conductive sheets 5 are maintained in a compressed condition, they continuously press the power generation element 4 through their resilience, thereby continuously maintaining good conductivity between the exterior can 2 and power generation element 4 and good conductivity between the seal can 3 and power generation element 4. Further, as a recoverable conductive sheet 5 is positioned between the recessed portion 211 of the exterior can 2 and the cathode layer 41 of the power generation element 4, the recoverable conductive sheet 5, during crimping of the exterior can 2 and seal can 3, is not displaced to such a degree as to be tucked in between the bottom 21 of the exterior can 2 and the gasket 6, thereby preventing an associated decrease in sealability. Further, it prevents contact between the cathode layer 41 and the periphery of the inner bottom surface of the recessed portion 211, thus preventing damage to the cathode layer 41.

It will be understood that the recoverable conductive sheets are not limited to a generally circular shape in plan view, and depending on the shape of the all-solid-state battery 1 in plan view; for example, the sheets may have an elliptical shape or a generally polygonal shape in plan view. Further, it is not necessary that recoverable conductive sheets 5 be provided both between the power generation element 4 and the inner bottom surface of the recessed portion 211 of the exterior can 2 and between the element and the flat portion 31 of the seal can 3; a recoverable conductive sheet may only be provided between the power generation element 4 and the inner bottom surface of the recessed portion 211 of the exterior can 2, or only between the power generation element 4 and the flat portion 31 of the seal can 3, where the sheet continuously presses the power generation element 4 through its resilience to maintain continuously good conductivity between the exterior can 2 and power generation element 4 and good conductivity between the seal can 3 and power generation element 4. Still, it may be noted that, since the peripheral edge of the flat portion 31 of the seal can 3 can receive forces during crimping and be deformed, a recoverable conductive sheet 5 at least provided adjacent to the flat portion 31 of the seal can 3 works as a shock absorber to prevent damage to the anode layer 42.

As discussed above, each recoverable conductive sheet 5 may be a graphite sheet. A graphite sheet is formed by rolling expanded graphite, and, more specifically, it is produced as follows: First, natural graphite is acidized to produce acidized graphite, and its particles are heated. During this, acids between the layers of the acidized graphite vaporize such that the graphite foams and expands. This expanded graphite is formed into felt and further rolled by a rolling machine to produce a sheet. A circular sheet portion is cut out of that expanded-graphite sheet to produce the intended graphite sheet. As discussed above, expanded graphite is formed as acids vaporize such that the acidized graphite foams. Thus, the graphite sheet is a porous sheet. As such, the graphite sheet possesses the conductivity possessed by the graphite itself and, in addition, good flexibility and recovery performance due to its porosity. Thus, each graphite sheet functions as a current collector and also prevents damage to, and a decrease in the conductivity of, the power generation element 4 which expands and contracts during charging and discharging. It will be understood that manufacture of the graphite sheets is not limited to this method, and any method may be used to manufacture the graphite sheets. Further, the recoverable conductive sheets 5 are not limited to graphite sheets, and may be made from conductive tape.

Now, the depth d and inner diameter d1 of the recessed portion 211 will be described in detail. As shown in FIG. 1, the depth d of the recessed portion 211 is larger than the thickness t of the associated recoverable conductive sheet 5. The inner diameter of the recessed portion 211 is larger than the diameter of the recoverable conductive sheet 5. In other words, the entire recoverable conductive sheet 5 is contained in the interior space of the recessed portion 211. This will prevent the recoverable conductive sheet 5 from being tucked in between the bottom 21 of the exterior can 2 and the gasket 6 during crimping of the exterior can 2 and seal can 3. As a result, the current collection efficiency of the recoverable conductive sheet 5 will be improved.

An excessively large thickness t of the recoverable conductive sheet 5 means a decreased proportion of the interior space of the all-solid-state battery 1 accounted for by the power generation element 4, which means a decreased battery capacity. In view of this, the ratio of the recoverable conductive sheet 5 to the depth d of the recessed portion 211, denoted as A(t/d), is to be lower than 1.0, preferably not higher than 0.9, and more preferably not higher than 0.8. On the other hand, an excessively thin recoverable conductive sheet 5 means a decreased ability to prevent damage and prevent a decrease in conductivity during expansion and contraction of the power generation element 4. In view of this, the ratio A(t/d) of the recoverable conductive sheet 5 to the depth d of the recessed portion 211 is to be not lower than 0.5, preferably not lower than 0.6, and more preferably not lower than 0.7.

More specifically, to improve the proportion of the interior space of the all-solid-state battery 1 accounted for by the power generation element 4, i.e., improve the battery capacity of the power generation element 4, as well as to prevent damage and prevent a decrease in conductivity during expansion and contraction of the power generation element 4, if the recoverable conductive sheets 5 are graphite sheets, the thickness t of each recoverable conductive sheet 5 (i.e., graphite sheet) is preferably not smaller than 0.05 mm, and more preferably not smaller than 0.07 mm; the thickness t is preferably not larger than 0.5 mm, and more preferably not larger than 0.2 mm. The statements about the thickness t of the recoverable conductive sheets 5 (i.e., graphite sheets) are not limited to graphite sheets, and may be applied to recoverable conductive sheets 5 formed from other materials, such as conductive tape.

Further, the apparent density of each recoverable conductive sheet 5 (i.e., graphite sheet) is preferably not lower than 0.3 g/cm$^3$, more preferably not lower than 0.7 g/cm$^3$; the apparent density is preferably not higher than 1.5 g/cm$^3$, and more preferably not higher than 1.3 g/cm$^3$. If the apparent density is too low, the recoverable conductive sheet 5 (i.e., graphite sheet) can easily be damaged; if the apparent density is too high, this means a low flexibility. The statements about the apparent density of the recoverable conductive sheets 5 (i.e., graphite sheets) are not limited to graphite sheets, and may be applied to recoverable conductive sheets 5 formed from other materials, such as conductive tape.

Further, the rate of recovery of each recoverable conductive sheet 5 (i.e., graphite sheet) is preferably not lower than 7%. As the recoverable conductive sheets 5 (i.e., graphite sheets) have such an appropriate recovery performance, the recoverable conductive sheets 5 (i.e., graphite sheets) properly press the power generation element 4. This will maintain good conductivity between the inner bottom surface of the recessed portion 211 of the exterior can 2 and the power generation element 4, and maintain good conductivity between the inner surface of the flat portion 31 of the seal can 3 and the power generation element 4. To maintain good conductivity, the rate of recovery is more preferably not lower than 10%. On the other hand, to mitigate pressing forces against the power generation element 4 generated during crimping of the exterior can 2 and seal can 3, the rate of recovery is preferably not higher than 80%, more preferably not higher than 50%, and particularly preferably not higher than 30%. As used herein, the rate of recovery is represented by the following expression:

$$(t2-t1)/(t-t1)\times 100(\%),$$

where t is the thickness of the recoverable conductive sheets 5 (i.e., graphite sheets), t1 is the thickness of the recoverable conductive sheets 5 (i.e., graphite sheets) upon compression with a predetermined pressing force, and t2 is the thickness of the recoverable conductive sheets 5 (i.e., graphite sheets) upon removal of a pressing force. A recoverable conductive sheet 5 (i.e., graphite sheet) with a rate of recovery that is not lower than a predetermined level is determined to be recoverable. Rate of recovery can be measured by a method specified by Japanese Industrial Standard JIS R3453-2001 (Joint Sheet). The statements about the rate of recovery of the recoverable conductive sheets 5 (i.e., graphite sheets) are not limited to graphite sheets, and may be applied to recoverable conductive sheets 5 formed from other materials, such as conductive tape.

In view of all this, it is preferable to decide on an apparent density or thickness of the recoverable conductive sheets 5 (i.e., graphite sheets) in a well-balanced manner, taking account of flexibility, recovery performance, and effective use of the interior space.

As discussed above, each recoverable conductive sheet 5 (i.e., graphite sheet) has good conductivity and flexibility. As such, the recoverable conductive sheet 5 (i.e., graphite sheet) is capable of functioning as a current collector and, at the same time, absorbing pressing forces during expansion and contraction of the power generation element 4 due to charging and discharging or during crimping of the exterior can 2 and seal can 3. Thus, the all-solid-state battery 1 is capable of reducing a decrease in battery performance caused by damage to the power generation element 4 or formation of a gap.

Further, each recoverable conductive sheet 5 (i.e., graphite sheet), which has good flexibility, has an appropriate recovery performance against compression caused by expansion due to charging of the power generation element 4 or pressing forces during crimping of the exterior can 2 and seal can 3, as discussed above. Thus, the all-solid-state battery 1 is capable of maintaining good conductivity between the inner surface of the bottom 21 of the exterior can 2 and the power generation element 4 and maintaining good conductivity between the inner surface of the flat portion 31 of the seal can 3 and the power generation element 4, thereby maintaining battery performance.

As shown in FIG. 1, the depth d of the recessed portion 211 is smaller than the height h. The height h is the height from the inner bottom surface of the recessed portion 211 to the upper end of the peripheral surface of the solid electrolyte layer 43. In other words, the height h is the total height of the cathode layer 41 and the solid electrolyte layer 43. This will prevent the bottom 21 of the exterior can 2 from contacting the anode layer 42 and causing a short circuit. In implementations where the cathode layer 41 and anode layer 42 are switched in position, the height h is the total height of the anode layer 42 and solid electrolyte layer 43.

The diameter d2 of the recoverable conductive sheet 5 associated with the recessed portion 211 is smaller than the inner diameter d1 of this portion such that the recoverable conductive sheet 5 is contained within the recessed portion 211. If the diameter d2 of the recoverable conductive sheet 5 is too large relative to the inner diameter d1 of the recessed portion 211, the recoverable conductive sheet 5 cannot easily be contained in the recessed portion 211. Thus, the ratio of the inner diameter d1 of the recessed portion 211 to the diameter d2 of the recoverable conductive sheet 5, denoted as C(d1/d2) is to be not lower than 1.02, preferably not lower than 1.05, and more preferably not lower than 1.08. On the other hand, if the diameter d9 of the recoverable conductive sheet 5 is too small relative to the inner diameter d1 of the recessed portion 211, this results in a small area of contact between the diameter d2 of the recoverable conductive sheet 5 and the power generation element 4, which decreases the current collection efficiency of the recoverable conductive sheet 5. In view of this, the ratio C(d1/d2) is to be not higher than 1.15, preferably not higher than 1.12, and more preferably not higher than 1.09. It is to be noted that the inner diameter d1 of the recessed portion 211 is smaller than the diameter of the cathode layer 41 of the power generation element 4. This is to allow the end of the power generation element 4 at the cathode layer 41 to be contained within the recessed portion 211, as shown in FIG. 1.

Figure 2:
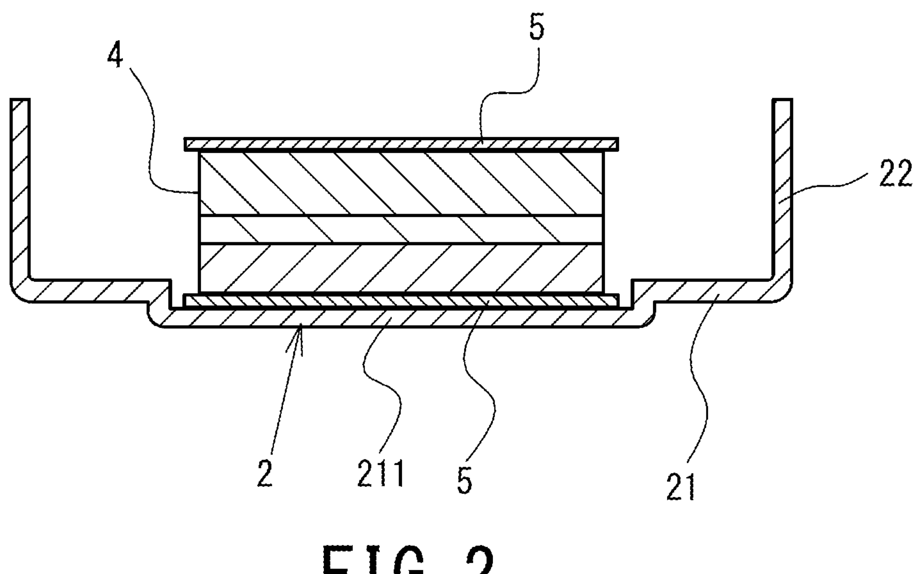
FIG. 2 is a cross-sectional view of part of the all-solid-state battery shown in FIG. 1, illustrating a manufacturing step.

Next, a method of manufacturing the all-solid-state battery 1 will be described. As shown in FIG. 2, one recoverable conductive sheet 5 is placed within the recessed portion 211 of the exterior can 2. Then, a power generation element 4 is placed on the upper surface of that recoverable conductive sheet 5 before another recoverable conductive sheet 5 is placed on the upper surface of the power generation element 4.

Figure 3:
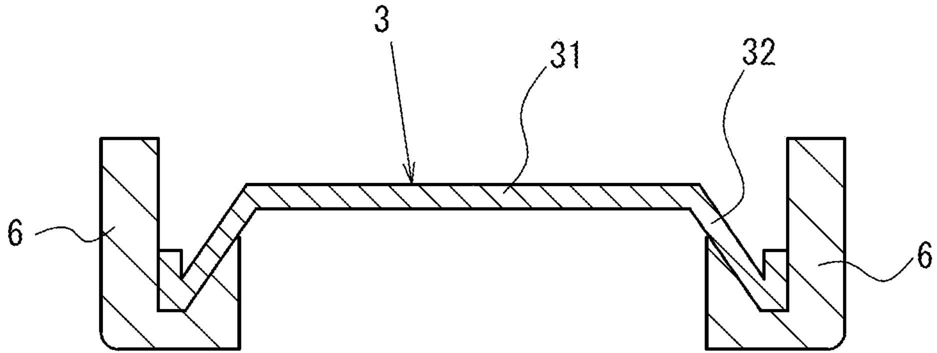
FIG. 3 is a cross-sectional view of part of the all-solid-state battery shown in FIG. 1, illustrating a manufacturing step.

Thereafter, as shown in FIG. 3, a gasket 6 is formed along the peripheral edge of the peripheral wall 32 of the seal can 3. The gasket 6 extends from the inner surface of the peripheral wall 32 past the peripheral edge of the peripheral wall 32 to the outside of the peripheral wall 32. Formation of the gasket 6 is not limited to any particular method; for example, injection molding may be employed.

Figure 4:
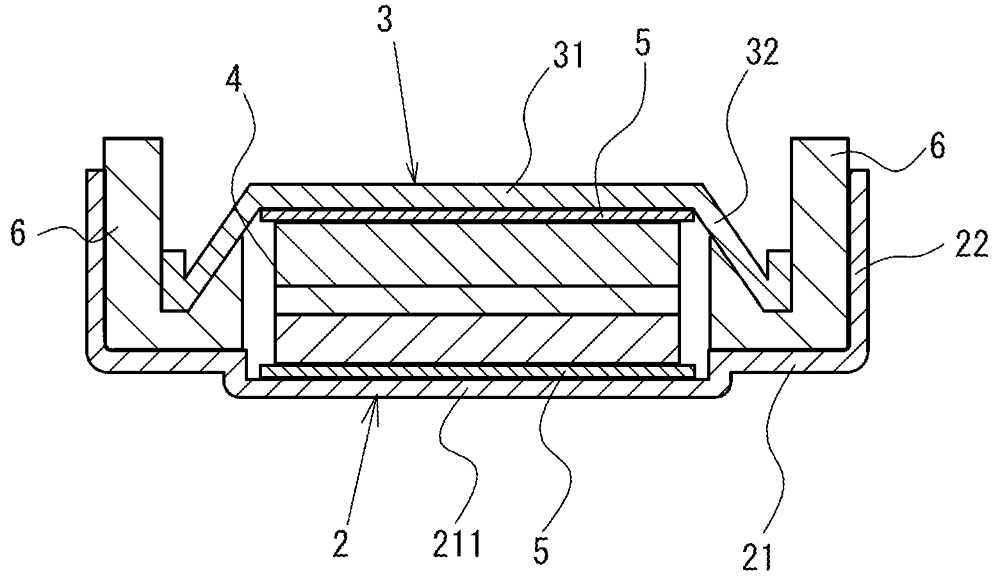
FIG. 4 is a cross-sectional view of the all-solid-state battery shown in FIG. 1, illustrating a manufacturing step.

Then, as shown in FIG. 4, the seal can 3 is placed on the exterior can 2 to cover its opening. During this, the gasket 6 contacts the inner surface of the bottom 21 of the exterior can 2 and thus does not enter the interior of the recessed portion 211. On the other hand, the recoverable conductive sheet 5 associated with the recessed portion 211 of the exterior can 2 is contained within it, and thus the recoverable conductive sheet 5 is prevented from being tucked in between the inner surface of the bottom 21 of the exterior can 2 and the gasket 6. Lastly, the distal end of the gasket 6 located outside the peripheral wall 32, together with the cylindrical side wall 22 of the exterior can 2, is pushed in toward the outer peripheral surface of the peripheral wall 32 of the seal can 3. Thus, the exterior can 2 and seal can 3 are crimped together, resulting in the all-solid-state battery 1 shown in FIG. 1.

The assembled all-solid-state battery 1 shown in FIG. 1, including the graphite sheets (i.e., recoverable conductive sheets 5), is capable of preventing damage to the cathode layer 41 and anode layer 42 by virtue of the recovery performance of the graphite sheets. Further, the all-solid-state battery 1 is capable of preventing one of the graphite sheets from being tucked in between the inner surface of the bottom 21 of the exterior can 2 and the gasket 6, which means a good sealability. Thus, a predetermined discharge capacity can be obtained by charging and discharging the all-solid-state battery 1.

Charge/discharge cycle tests were conducted on an all-solid-state battery 1 as shown in FIG. 1 having recoverable conductive sheets 5 constituted by graphite sheets, and all-solid-state batteries having the same construction as the all-solid-state battery 1 shown in FIG. 1 except in that the bottom of the exterior can is flat, with no recessed portion provided.

The recoverable conductive sheets 5 used were graphite sheets with a thickness of 0.1 mm, an apparent density of 1.2 $g/cm^3$ and a rate of recovery of 12%. The former all-solid-state battery 1 is capable, after repeated charge/discharge cycles, of continuously maintaining good conductivity between the exterior can 2 and seal can 3, on the one hand, and the power generation element 4, on the other, and thus, after 100 cycles, was able to maintain a discharge capacity not lower than 95% of that prior to the repeated charge/discharge cycles.

On the other hand, in some of the latter all-solid-state batteries, a graphite sheet was displaced and thus decreased sealability such that water in the air entered, decreasing battery properties. As such, some of the latter all-solid-state batteries did not reach a predetermined discharge capacity.

Further, the same charge/discharge cycle tests were conducted on an all-solid-state battery having the same construction as the all-solid-state battery 1 shown in FIG. 1 except in that the recoverable conductive sheets 5 (i.e., graphite sheets) were replaced by foam substrates made of metal and having a thickness of 1 mm and a porosity of 97% (with the exterior can made of aluminum and the seal can made of copper). The foam substrates of this all-solid-state battery are current collectors that have substantially no recovery performance and are thus incapable of continuously maintaining good conductivity between the exterior can and seal can, on the one hand, and the power generation element, on the other. As a result, the discharge capacity of this all-solid-state battery, after 100 cycles, decreased to approximately 10% of that prior to the repeated charge/discharge cycles.

(Variations)

Although the all-solid-state battery 1 according to the above-described embodiments includes a recoverable conductive sheet 5 between the power generation element 4 and the inner bottom surface of the recessed portion 211 of the exterior can 2 and another recoverable conductive sheet 5 between the power generation element 4 and the inner surface of the flat portion 31 of the seal can 3, a recoverable conductive sheet 5 may only be provided between the power generation element 4 and the inner surface of the flat portion 31 of the seal can 3.

Figure 5:
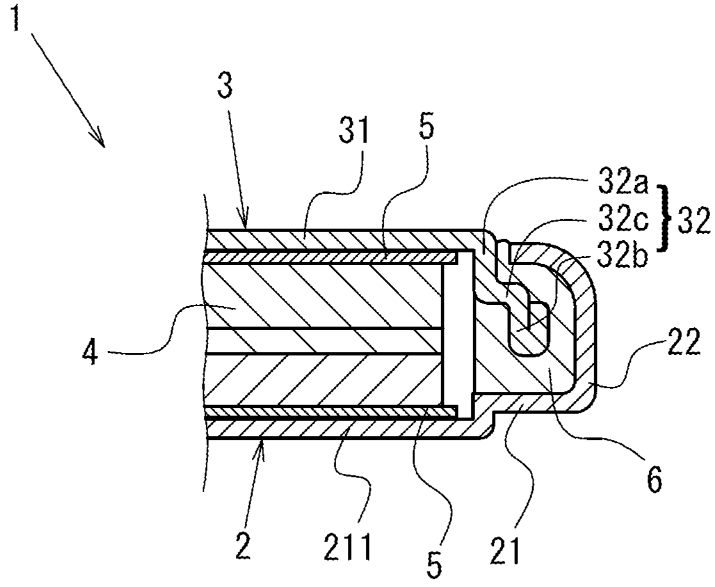
FIG. 5 is a cross-sectional view of part of a variation of the all-solid-state battery, illustrating its structure.

Further, as shown in FIG. 5, the peripheral wall 32 of the seal can 3 may be composed of a base-end portion 32*a*, an outspread portion 32*b* and a stepped portion 32*c*. In longitudinal cross-sectional view, the base-end portion 32*a* extends from the flat portion 31 generally perpendicularly thereto. The outspread portion 32*b* is provided in a stepped manner, with the stepped portion 32*c* positioned between it and the base-end portion 32*a*, so as to have a larger diameter than the base-end portion. In other words, the stepped portion 32*c* is provided between the base-end portion 32*a* and outspread portion 32*b*. The open end of the cylindrical side wall 22 of the exterior can 2 is bent and crimped toward the stepped portion 22*c*. This allows the exterior can 2 and seal can 3 to be sufficiently crimped and also makes it possible to provide a larger diameter of the flat portion 31 of the seal can 3 than in the all-solid-state battery 1 according to the above-described embodiments. As a result, in implementations where the all-solid-state battery 1 shown in FIG. 5 has the same diameter as the all-solid-state battery 1 according to the above-described embodiments, the interior space of the all-solid-state battery 1 can be used more effectively, or, in implementations where its interior space contains a power generation element 4 with the same diameter as that of the all-solid-state battery 1 according to the above-described embodiments, the size of the all-solid-state battery 1 can be reduced. In the all-solid-state battery 1 shown in FIG. 5, the peripheral wall 32 of the seal can 3 is sharply bent at its open end such that the outspread portion 32*b* is represented by a double wall; alternatively, the outspread portion 32*b* may not be bent and may be constituted by a straight wall, that is, the distal end of the peripheral wall 32 may face the bottom 21 of the exterior can 2.

Although embodiments have been described, the present disclosure is not limited to these embodiments, and various modifications are possible without departing from the spirit of the disclosure.

REFERENCE SIGNS LIST

1: all-solid-state battery
2: exterior can; 21: bottom; 211: recessed portion; 22: cylindrical side wall
3: seal can; 31: flat portion; 32: peripheral wall
4: power generation element; 41: cathode layer; 42: anode layer; 43: solid electrolyte layer
5: recoverable conductive sheets
6; gasket

The invention claimed is:

1. An all-solid-state battery comprising:
an exterior can having a bottom with a recessed portion recessed toward an outside and a cylindrical side wall;
a seal can having a flat portion and a peripheral wall for covering an opening of the exterior can;
a power generation element including a cathode layer, an anode layer and a solid electrolyte layer located between the cathode layer and the anode layer, the power generation element located between an inner bottom surface of the recessed portion of the exterior can and the flat portion of the seal can;
a gasket to be crimped between the cylindrical side wall of the exterior can and the peripheral wall of the seal can; and
a recoverable conductive sheet made of a foamed material located between the power generation element and at least one of the inner bottom surface of the recessed portion and the flat portion of the seal can,
wherein the foamed material is made of an expanded graphite.

2. The all-solid-state battery according to claim 1, wherein:
the recoverable conductive sheet is located between the inner bottom surface of the recessed portion and the power generation element; and
the recessed portion has a depth larger than a thickness of the recoverable conductive sheet.

3. The all-solid-state battery according to claim 1, wherein a first recoverable conductive sheet is located between the inner bottom surface of the recessed portion and the power generation element,
the all-solid-state battery further comprising:
a second recoverable conductive sheet located between the flat portion of the seal can and the power generation element.

4. The all-solid-state battery according to claim 1, wherein the recessed portion has a depth smaller than a height from the inner bottom surface of the recessed portion to an upper end of a peripheral surface of the solid electrolyte layer.

5. The all-solid-state battery according to claim 1, wherein the recoverable conductive sheet has a rate of recovery of 7 to 80%.

* * * * *